H. L. BLOOD.
PLANER AND SYSTEM OF MOTOR CONTROL THEREFOR.
APPLICATION FILED JUNE 10, 1920.

1,370,726.

Patented Mar. 8, 1921.

INVENTOR.
Harold L. Blood
BY S. Jay Teller
ATTORNEY.

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

1,370,726.  Specification of Letters Patent.  Patented Mar. 8, 1921.

Application filed June 10, 1920. Serial No. 388,059.

*To all whom it may concern:*

Be it known that I, HAROLD L. BLOOD, a citizen of the United States, and a resident of Plainfield, in the county of Union and State of New Jersey, have invented certain new and useful Improvements in Planers and Systems of Motor Control Therefor, of which the following is a specification.

The invention relates particularly to planers of the type in which each is provided with a reversing driving motor and a generator connected in normally closed circuit with the motor to supply current thereto and to control it. It will be understood that when I refer to a planer I intend to include any mechanism, particularly a machine tool, having the same essential characteristic elements.

The construction embodying the present invention is in some respects similar to that set forth in my copending application for planers and systems of motor control therefor, Serial No. 154,927, filed March 15th, 1917. The principal object of the invention is to provide a planer of the type specified having improved and simplified means whereby the generator and the motor can be controlled by a manually operable switch supplemental to the table operated switch which ordinarily serves to effect the control.

In the accompanying drawing I have illustrated the invention as applied to a planer but it will be understood that the drawing is for illustrative purposes only and is not to be construed as defining or limiting the scope of the invention, the accompanying claims being relied upon for that purpose.

Figure 1:
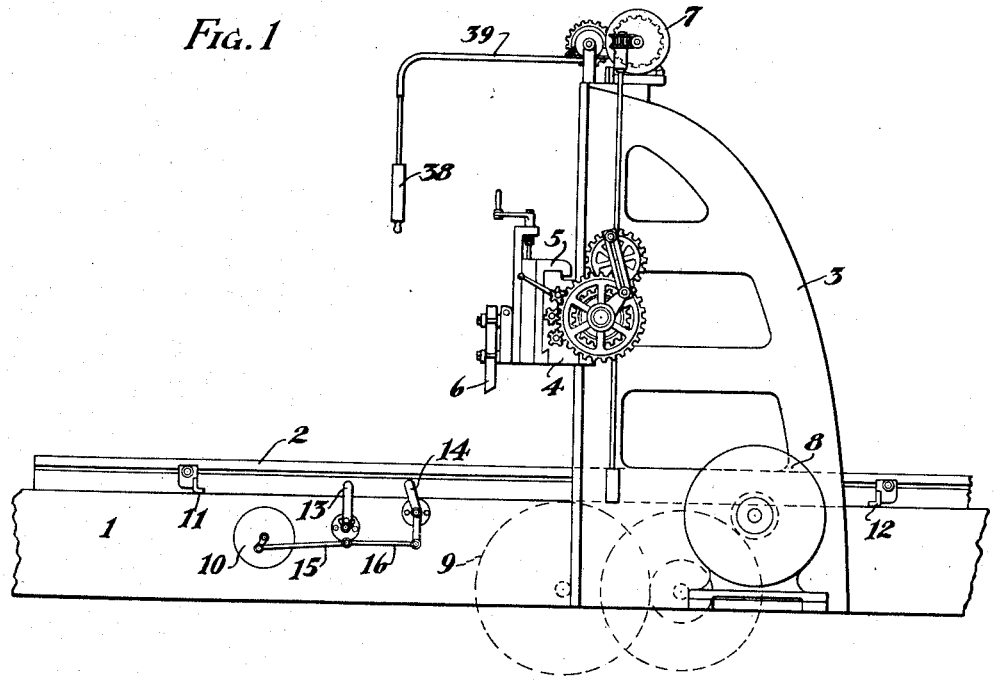
Figure 1 is a fragmentary side view of a planer embodying the invention.

Referring to the drawing, 1 represents the bed of the planer and 2 the work-carrying table which is reciprocable longitudinally of the bed. At the sides of the bed and of the table are located uprights 3 of which one is shown in the drawing. Carried by the uprights and vertically adjustable thereon is a crossrail 4. Transversely adjustable along the crossrail are one or more crossheads 5 adapted to carry tools 6. For moving the crossrail vertically and for adjusting the crossheads there is provided a suitable mechanism which, as shown, includes a separate electric motor 7. The mechanical and electrical connections for the motor 7 constitute no part of the present invention and detailed description is unnecessary. As illustrated, these parts are similar to those shown in the Greenleaf & Keefer Patent No. 1,299,192, dated April 1st, 1919, to which patent reference can be had for detailed information.

For driving the reciprocating table 2 there is provided an electric motor 8 which is directly connected to the table by means of suitable spur gearing such as indicated at 9. For controlling the motor there is provided a pilot switch 10 secured to the planer bed and adapted to be operated by adjustable dogs 11 and 12 engaging levers 13 and 14. As shown, these levers are connected with the pilot switch by means of links 15 and 16. It will be seen that at the end of the movement of the bed toward the right, that is, at the end of the cutting stroke, the dog 11 will engage the lever 13 and move the switch 10 in one direction; and at the end of the movement of the table toward the left, that is, in the return direction, the dog 12 will engage the lever 14 and move the switch 10 in the opposite direction.

Figure 2:
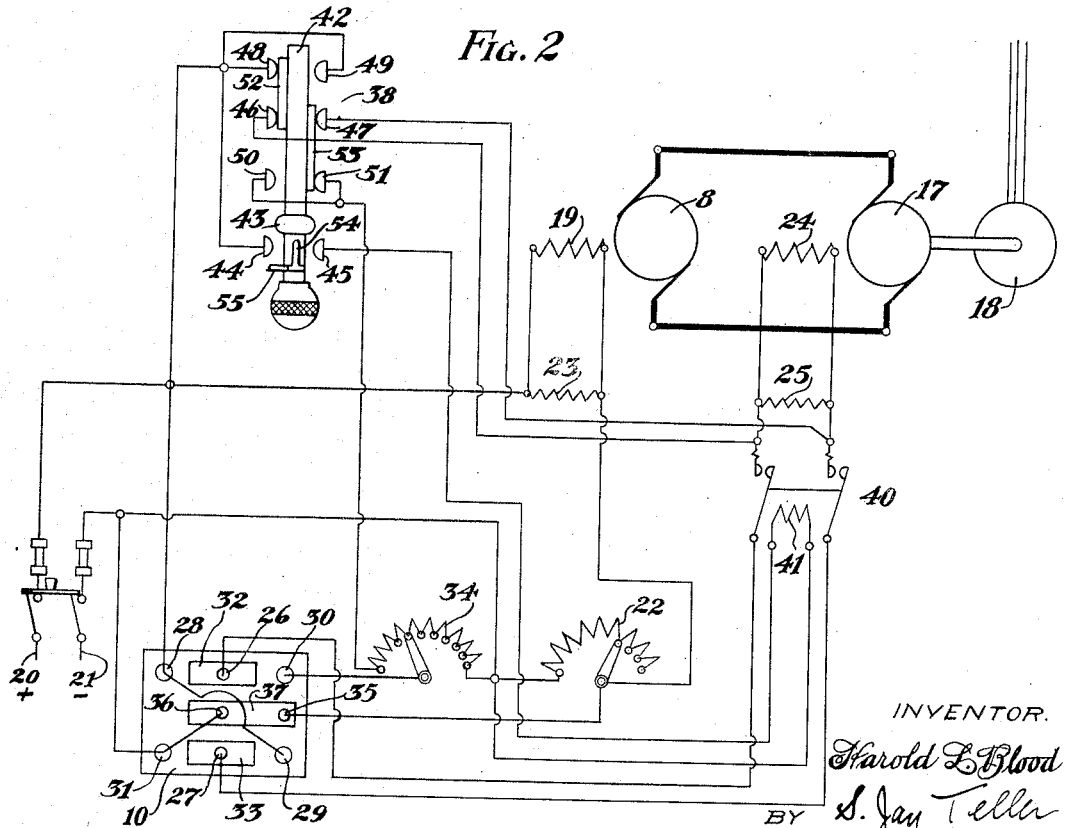
Fig. 2 is a diagram of the electrical connections.

The electrical diagram in Fig. 2 presents a system which for the sake of convenience is illustrated in simplified form. It will be understood that in practice various changes and additions may be made, such as are necessary for a practical system.

Referring to the electrical diagram in Fig. 2, it will be seen that the main motor 8 receives its current from a generator 17, the armatures of the motor and the generator being connected in a circuit which is permanently closed during normal operation of the planer. The generator 17 is continuously driven, as for instance, by means of a motor 18 which is shown as an alternating current motor.

The motor 8 has a field winding 19 which is continuously energized from any suitable external source of direct current. As illustrated, one side of the field is connected directly with the positive lead 20 and the other side of the field is connected with the negative lead 21 through an adjustable resistance 22. Preferably a choke coil 23 is provided for protecting the field.

The generator 17 has a field winding 24 which is adapted to be energized from any suitable external source of direct current, preferably the same leads 20 and 21 that are used for the motor 8. The connections for the field 24 will be described hereinafter in detail. Preferably there is provided a choke coil 25 for protecting the said field 24.

The before mentioned table operated pilot switch 10 is provided with stationary contacts 26 and 27 respectively connected or adapted to be connected with the opposite sides of the field 24. The switch 10 is also provided with contacts 28 and 29 both connected to the positive lead 20 and stationary contacts 30 and 31 both connected to the negative lead 21. The drum of the switch 10 carries two movable contacts 32 and 33. When the switch 10 is in its right hand position the contact 32 connects the contacts 26 and 30 and the contact 33 connects the contacts 27 and 29. The field 24 of the generator 17 is thus energized. Inasmuch as the armatures of the generator 17 and of the motor 8 are connected in a closed circuit as already stated, the energization of the field 24 causes the generator to generate a current which is transmitted to the motor armature. The electrical connections are such that the current is in the proper direction to cause the motor to rotate in the direction to move the planer table in the direction for cutting. Interposed in the circuit, preferably between the contact 30 and the negative lead is an adjustable resistance 34. By adjusting this resistance the energization of the field 24 may be varied and thus the speed of the motor and of the planer table during the cutting movement may be regulated.

When the planer table is to be reversed the motor 8 must be reversed and this is effected by reversing the current produced by the generator 17. The generator current is reversed by reversing the energization of the field 24. The switch 10 is automatically moved at the end of the cutting stroke from its right hand position to its left hand position and the contact 32 then connects the contacts 28 and 26 and the contact 33 connects the contacts 31 and 27. In this way current is sent through the generator field 24 in the reverse direction, the resistance 34 being excluded from the circuit. The field excitation is now stronger than it was before and the result is that current is generated at a higher voltage, thus tending to cause the motor to rotate at a higher speed and to drive the table at the relatively high speed which is desirable for the return stroke. The speed of return may be regulated by adjusting the before mentioned resistance 22, thus varying the strength of the motor field 19. At the end of the return stroke the switch 10 is again returned to its right hand position and the motor is again reversed for another cutting stroke.

The switch 10 is preferably provided with supplemental stationary contacts 35 and 36 and with a supplemental movable contact 37. When the switch is in its right hand position for cutting the two contacts 35 and 36 are connected by the contact 37, thus short circuiting the resistance 22. As the result the field 19 is strongly energized thereby causing the motor to have a large torque and relatively low speed. When the motor is reversed to drive the table in the return direction the resistance 22 is in circuit in order to reduce the motor field strength and give increased speed.

When the generator 17 is deënergized at the end of a stroke the motor 8 acts as a generator to effect dynamic braking. It is desirable to have this braking effect of the motor definite and uniform and as powerful as possible without producing excessive current. In order to attain these results the motor field is kept fully energized during braking. To this end the switch contact 37 is made long enough to connect the contacts 36 and 35 when the switch is in an intermediate or neutral position. This is important in order to insure a maximum braking effect not only during normal operation but also when the switch is manually thrown to neutral position to stop the planer.

In accordance with the present invention I provide a supplemental manually operable switch 38 by means of which the planer can be controlled for effecting preliminary adjustments and for other purposes. This switch is preferably a pendant switch located at any convenient place and connected by means of a flexible cable. As shown in Fig. 1, the switch is suspended from a pipe or bar 39 carried by the arch of the planer.

As will presently be described in detail, the switch 38 is provided with contacts whereby the generator field 24 may be controlled independently of the table operated switch 10. When the field is to be controlled by the switch 38 it is necessary or at least desirable to entirely disconnect it from the switch 10. For this purpose I provide a switch 40. This switch is preferably a two-pole switch so as to interrupt both of the connections between the field 24 and the switch 10. By preference the switch 40 is a magnetically operable relay switch being provided with an operating magnet 41.

The switch 38 in its preferred form comprises a manually operable core 42 which is movable longitudinally and angularly. Secured to the core is a contact 43 which during normal operation of the planer serves to connect two relatively fixed contacts 44 and 45. These contacts 44 and 45 are in the circuit of the operating magnet 41. Therefore when the contacts 44 and 45 are connected the magnet 41 is energized and the switch 40 is closed, thus maintaining the connection between the generator field 24 and the switch 10.

The switch 38 is provided with two relatively fixed contacts 46 and 47 which are permanently connected respectively with the two sides of the generator field 24. The switch is also provided with two contacts 48 and 49 connected with the positive lead 20 and with two fixed contacts 50 and 51 connected with the negative lead 21 through all of the resistance 34. Secured to the core 42 of the switch 38 are contacts 52 and 53 which can be brought into operative relation with the contacts 46 to 51 by upward movement of the core. This upward movement of the core first serves to disconnect the contacts 44 and 45, thus automatically causing the switch 40 to open and render the automatic table operated switch 10 ineffective. By turning the core 42 in one direction the contacts 48 and 46 and the contacts 47 and 51 can be connected as shown. Current is thus supplied to the field 24 in one direction and the motor 8 is therefore caused to rotate in the corresponding direction. The speed of rotation of the motor, however, is relatively low as all of the resistance 34 is in the circuit, thus providing a weak generator field. By turning the core 42 through 180° the contacts 49 and 47 are connected and also the contacts 46 and 50. Current is then supplied to the generator field 24 in the reverse direction.

Preferably the switch 38 is so constructed that none of the contacts 46 to 51 can be engaged when the contacts 44 and 45 are engaged and so that the said contacts 44 and 45 cannot be engaged when any of the contacts 46 to 51 are engaged. As illustrated, the core 42 is provided with a bayonet slot 54 into which extends a relatively fixed pin 55. It will be seen that the pin prevents the upward or downward movement of the core until it has been turned through approximately 90° from the position shown. When the core has been turned through 90° and then moved longitudinally downward the pin is then entered in the vertical part of the slot and prevents any turning movement of the core.

From the foregoing description it will be seen that in accordance with my invention I have provided a very simple system of electrical connections whereby the generator field may be controlled either automatically by a table operated switch or manually by a supplemental pendant switch. The relay switch 40 serves to interrupt the relatively large normal field current, thus making it unnecessary to interrupt this current at the pendant switch 10. The field current which does flow through the pendant switch is relatively small as all of the resistance 34 is always included in the circuit.

What I claim is:

1. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch having contacts permanently connected with the generator field, whereby the said supplemental switch is adapted to control and reverse the field current of the generator, and a relay switch operable by the supplemental switch for rendering the automatic switch ineffective.

2. The combination of a reciprocating table, a reversing electric motor connected to the table, a generator having its armature connected in closed circuit with the motor armature, adjustable resistances connected respectively in series with the motor and generator fields, an automatic table operated switch for successively reversing the field circuit of the generator to change the polarity and thereby successively reverse the motor and cause it to drive the table successively in opposite directions, a manually operable switch supplemental to the table operated switch having contacts permanently connected with the generator field through all of the generator field resistance, whereby the said supplemental switch is adapted to control and reverse the field current of the generator, and a relay switch operable by the supplemental switch for rendering the automatic switch ineffective.

3. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch having contacts permanently connected with the generator field, whereby the said supplemental switch is adapted to control and reverse the field current of the generator, and a relay switch automatically operable by the supplemental switch for rendering the automatic switch inoperative when the supplemental switch is in use.

4. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a relay switch for opening and closing the connection between the automatic switch and the generator field, a manually operable switch supplemental to the table operated switch having contacts permanently connected with the generator field, whereby the said supplemental switch is adapted to control and reverse the field current of the generator, the said supplemental switch also having other contacts connected with the relay switch, and means for preventing the engagement of any of the first said contacts when the second said contacts are engaged to close the relay switch and for preventing the engagement of the second said contacts when any of the first said contacts are engaged.

In testimony whereof I hereto affix my signature.

HAROLD L. BLOOD.